United States Patent
Akiyama

(10) Patent No.: US 9,105,190 B2
(45) Date of Patent: Aug. 11, 2015

(54) DRIVING SUPPORT SYSTEM FOR A VEHICLE

(75) Inventor: Tomonori Akiyama, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/347,072

(22) PCT Filed: Sep. 26, 2011

(86) PCT No.: PCT/JP2011/071889
§ 371 (c)(1),
(2), (4) Date: Mar. 25, 2014

(87) PCT Pub. No.: WO2013/046299
PCT Pub. Date: Apr. 4, 2013

(65) Prior Publication Data
US 2014/0236428 A1 Aug. 21, 2014

(51) Int. Cl.
*B62D 6/00* (2006.01)
*B62D 1/00* (2006.01)
*G08G 1/16* (2006.01)
*B60W 30/16* (2012.01)
*B60W 30/09* (2012.01)
*B60W 10/20* (2006.01)
*B60W 30/095* (2012.01)
*B60W 10/184* (2012.01)
*B60W 50/00* (2006.01)

(52) U.S. Cl.
CPC ............ *G08G 1/165* (2013.01); *B60W 10/184* (2013.01); *B60W 10/20* (2013.01); *B60W 30/09* (2013.01); *B60W 30/095* (2013.01); *B60W 2050/0094* (2013.01); *B60W 2520/10* (2013.01); *B60W 2520/125* (2013.01); *B60W 2520/14* (2013.01); *B60W 2540/18* (2013.01); *B60W 2710/202* (2013.01); *B60W 2710/207* (2013.01)

(58) Field of Classification Search
USPC .................... 701/41–42, 70, 79–80, 96, 301; 340/435–436
See application file for complete search history.

(56) References Cited

U.S. PATENT DOCUMENTS

| 8,565,976 B2 * | 10/2013 | Kojo et al. ................. 701/41 |
| 2001/0020217 A1 | 9/2001 | Matsuno |
| 2009/0228174 A1 * | 9/2009 | Takagi et al. ............... 701/41 |

(Continued)

FOREIGN PATENT DOCUMENTS

| JP | H10264795 A | 10/1998 |
| JP | 2001-247023 | 9/2001 |

(Continued)

*Primary Examiner* — Yonel Beaulieu
(74) *Attorney, Agent, or Firm* — Kenyon & Kenyon LLP

(57) ABSTRACT

When a solid object is recognized in the direction of movement of an own vehicle, in a system which carries out driving support of a vehicle, turning control of the own vehicle is performed by a support control unit in order to avoid a collision with the solid object. Then, the turning control by the support control unit is stopped by a turning control stop unit, in cases where a correlation between a vehicle state related to turning of the own vehicle and a value of a predetermined parameter related to the turning control does not belong to a range of normal state set in advance, after the turning control by the support control unit has been started. This stops excessive steering of a steering resulting from a low friction of a traveling road surface, so that a strange or uncomfortable feeling of a driver can be eliminated.

2 Claims, 7 Drawing Sheets

(56) References Cited

U.S. PATENT DOCUMENTS

2010/0222960 A1* 9/2010 Oida et al. .................. 701/29
2010/0228444 A1* 9/2010 Kojo et al. .................. 701/42
2012/0212353 A1* 8/2012 Fung et al. ................. 340/905
2013/0226408 A1* 8/2013 Fung et al. .................. 701/41

FOREIGN PATENT DOCUMENTS

| JP | 2010-163164 | 7/2010 |
| JP | 2010-274880 | 12/2010 |
| JP | H08-276859 | 1/2011 |

* cited by examiner

DRIVING SUPPORT SYSTEM FOR A VEHICLE

CROSS-REFERENCE TO RELATED APPLICATIONS

This is a national phase application based on the PCT International Patent Application No. PCT/JP2011/071889 filed on Sep. 26, 2011, the entire contents of which is incorporated herein by reference.

TECHNICAL FIELD

The present invention relates to a driving support technology for an own vehicle, such as a collision avoidance technology.

BACKGROUND ART

In the past, there has been developed a technology in which when a three-dimensional or solid object existing ahead of an own or subject vehicle is detected and a collision between the solid object thus detected and the subject vehicle is predicted, brakes are electrically operated so as to avoid the collision of the subject vehicle with the solid object by means of a braking force. However, only with the collision avoidance due to the braking force, there may occur a variation in the generated braking force depending on the condition of a traveling road surface or the state of tires, and in addition, such breaking may become a factor which causes sudden braking. As a result, there is developed a technology in which an avoidance operation is carried out by means of turning motions, in cases where sufficient collision avoidance can not be attained with the braking force (for example, see a first patent document).

PRIOR ART REFERENCES

Patent Documents

Patent Document 1: Japanese patent application laid-open No. 2001-247023

SUMMARY OF THE INVENTION

Problems to be Solved by the Invention

However, as in the conventional technology, in cases where the driver tries to turn the subject vehicle so as to avoid the collision with the solid object, the steering of the subject vehicle is automatically controlled so as to perform turning control of the subject vehicle. At this time, in cases where the condition of a road surface on which the subject vehicle is traveling is such that the friction coefficient thereof is relatively low (e.g., traveling on a road surface in case of rainy weather), reaction forces, which the wheels of the subject vehicle receive from the road surface at the time of turning, will become small, so the steering will turn too much in order to obtain a desired turning state of the subject vehicle, thus forming a situation which is not matched with the driving feeling of the driver.

In addition, in cases where the friction state of the road surface on which the subject vehicle is traveling is unstable, when the friction condition of the road surface varies and the friction becomes large in a state where the steering has excessively turned too much due to the low friction of the road surface as mentioned above, a reaction force which the subject vehicle receives from the road surface will change suddenly, and so, there will be a fear that a stable travel state of the subject vehicle may be obstructed or impaired.

The present invention has been made in view of the various circumstances as referred to above, and has for its object to provide, in a system for carrying out driving support such as collision avoidance of a vehicle, etc., a driving support technology which enables the vehicle to travel in a stable manner, and which is suitable for the feeling of a driver.

Means for Solving the Problem

In order to solve the above-mentioned problems, the present invention resides in a system for supporting collision avoidance of a vehicle in which in cases where a solid object has been recognized in a direction of movement of a subject vehicle, turning control of the vehicle is carried out, and at the same time, in cases where during the turning control, a predetermined parameter related to the turning control and the state of the vehicle do not belong to a range of normal state which has been set in advance, the turning control is stopped. That is, in cases where the state of the vehicle is in an undesirable state due to the turning control, it becomes possible to avoid, by stopping the turning control, a strange or uncomfortable feeling from being given to a driver.

Specifically, a driving support system for a vehicle according to the present invention is provided with: a recognition unit configured to recognize a solid object existing in a direction of movement of a subject vehicle; a support control unit configured to perform turning control on the subject vehicle for avoiding a collision between the solid object and the subject vehicle based on a travel state of the subject vehicle, in cases where an existence of the solid object has been recognized by the recognition unit; and a turning control stop unit configured to stop the turning control by the support control unit, in cases where a correlation between a vehicle state related to turning of the subject vehicle and a value of a predetermined parameter related to the turning control does not belong to a range of normal state set in advance, after the turning control by the support control unit has been started.

In the driving support system according to the present invention, when the existence of the solid object in the direction of movement of the subject vehicle is recognized by the recognition unit, turning control for causing the subject vehicle to turn is carried out by means of the support control unit, in order for the vehicle to avoid the solid object thus recognized. With respect to the turning control of the subject vehicle, for example, an avoidance target path for collision avoidance on which the subject vehicle can travel is calculated based on the travel state of the subject vehicle, and the steering of the subject vehicle is controlled in such a manner that a yaw rate necessary for the subject vehicle to travel on the avoidance target path is generated. In addition, the turning control may be carried out by means of a technique or method other than the steering control, e.g., by providing a difference between the braking forces of the right and left wheels of the subject vehicle. Here, with respect to the calculation of the avoidance target path, no particular condition is imposed on the contents of the control with respect to the turning and braking of the subject vehicle for achieving the traveling thereof on the avoidance target path, but on the other hand, in cases where the driver wants to control the behavior of the subject vehicle at the time of turning or at the time of deceleration by braking to a predetermined state according to a predetermined purpose, etc., the avoidance target path may be calculated on the assumption that conditions according to the purpose (e.g., a condition in which a transverse acceleration of the subject vehicle at the time of turning is made equal to or less than a predetermined acceleration, etc.) are imposed on the control with respect to the turning and braking of the subject vehicle.

Here, when the turning control of the subject vehicle is started by the support control unit, the control of the steering is carried out so as to avoid a collision with the solid object, but in cases where the friction of a road surface on which the subject vehicle travels is low, a reaction force which the vehicle receives from the road surface becomes small, so it will be in a state where excessive turning control is performed such as where a steering operation of the steering is carried out to an excessive extent for the turning of the subject vehicle. That is, the correlation between the vehicle state with respect to the turning of the subject vehicle and the value of the predetermined parameter with respect to the turning control carried out by the support control unit may reach an excessively controlled state beyond a range of normal state which has been set in advance, due to a decrease in the friction of the traveling road surface. In such a case, it will become a state where the steering is operated to an excessive extent, etc., though the actual traveling state of the subject vehicle itself does not change to a large extent, as a result of which a strange, unharmonious or uncomfortable feeling will be given to the driver of the subject vehicle.

Accordingly, in such a case, with the driving support system for a vehicle according to the present invention, the turning control stop unit stops the turning control of the subject vehicle by the support control unit. As a result, the excessive steering operation of the steering as mentioned above, etc., will be stopped, thus making it possible to reduce the strange, unharmonious or uncomfortable feeling felt by the driver. Moreover, in cases where the state of the steering being operated to an excessive extent is continued, though the actual traveling state of the subject vehicle itself does not change to a large extent, if the friction of the traveling road surface of the subject vehicle varies suddenly and becomes high, the reaction force received by the subject vehicle from the road surface becomes also large, and so, there will be a fear that the travel state of the subject vehicle may become unstable. However, by stopping the excessive turning control by means of the turning control stop unit, as mentioned above, it becomes possible to avoid the instability of the travel state in an appropriate manner.

Here, as a parameter indicating the vehicle state of the subject vehicle under turning control, there are mentioned a steering angle of the steering, a yaw rate of the subject vehicle, a transverse or lateral acceleration acting on the subject vehicle, and so on. In cases where variations in these parameters are not caused according to the turning control, or in cases where the variations are excessively small, etc., though the turning control of the subject vehicle is carried out by the support control unit, there will be a possibility that an excessive steering operation of the steering may occur due to the decrease in the friction of the traveling road surface.

More specifically, in the above-mentioned driving support system for a vehicle, a construction may be adopted such that in cases where provision is further made for a steering torque generator that serves to apply a steering torque for turning to the steering of the subject vehicle according to a turning command from the support control unit, wherein the turning control stop unit stops the turning control by the support control unit, in cases where a correlation between at least any among a steering angle of the steering, a yaw rate of the subject vehicle, and a transverse acceleration acting on the subject vehicle, as a parameter indicating the vehicle state, and the steering torque applied to the steering by means of the steering torque generator does not belong to the range of normal state. That is, in the state where the turning control is carried out, in cases where there is a shift in the balance between the steering torque applied to the steering by means of the steering torque generator, and the steering angle of the steering or the like related to the turning of the subject vehicle which is actually in a turning state, it is meant that the vehicle state does not belong to the range of normal state, thus resulting in that the turning control by the support control unit is stopped.

Here, in the above-mentioned driving support system for a vehicle, the range of normal state may be set to correspond to the steering torque, based on an operating state of the steering which the driver of the subject vehicle can permit, at the time when the turning control is carried out by the support control unit. That is, it is preferable that the normal state with respect to the vehicle state of the subject vehicle be set on the basis of a state where the driver does not have a strange or uncomfortable feeling based on a standard range of variation in the friction of the traveling road surface.

In addition, in the driving support system for a vehicle as stated above, it is preferable for the support control unit to decelerate the subject vehicle by means of control with respect to braking of the subject vehicle, when the turning control of the subject vehicle is stopped by the turning control stop unit. When the turning control is stopped by the turning control stop unit, it will become difficult to avoid the collision with the solid object by turning the subject vehicle. Accordingly, in cases where the turning control is stopped, it becomes possible, by performing control on braking, to stop, if possible, the subject vehicle prior to its collision with the solid object, or to reduce, even in the case of colliding with the solid object, shock at the time of the collision as much as possible. Also, by performing only the control with respect to braking, it will become easier to maintain, even if the friction of the traveling road surface varies to a large extent, the travel state of the subject vehicle in a stable manner in comparison with the case where the friction varies in the state of carrying out the turning control. Here, it is preferable that in cases where the control with respect to braking as well as the turning control is performed at the time when the turning control is carried out by the support control unit, the braking force of the subject vehicle be controlled to become a maximum braking force when the turning control is stopped by the turning control stop unit.

Advantageous Effect of the Invention

According to the present invention, in a system for carrying out driving support such as collision avoidance of a vehicle, etc., it becomes possible to provide a driving support technology which enables the vehicle to travel in a stable manner, and which is suitable for the feeling of a driver.

EMBODIMENTS FOR CARRYING OUT THE INVENTION

Hereinafter, specific embodiments of the present invention will be described based on the attached drawings. Here, an example will be described in which the present invention is applied to a system which performs driving support for determining the travel path (lane) of an own (subject) vehicle and a three-dimensional (solid) object which is an obstacle thereon, and avoiding a deviation from the travel lane thus determined and a collision with the solid object, or reducing damage at the time of the collision. In addition, a construction described in the following embodiment shows one form of practical embodiment of the present invention, and does not limit the construction of the present invention.

First Embodiment

Figure 1:
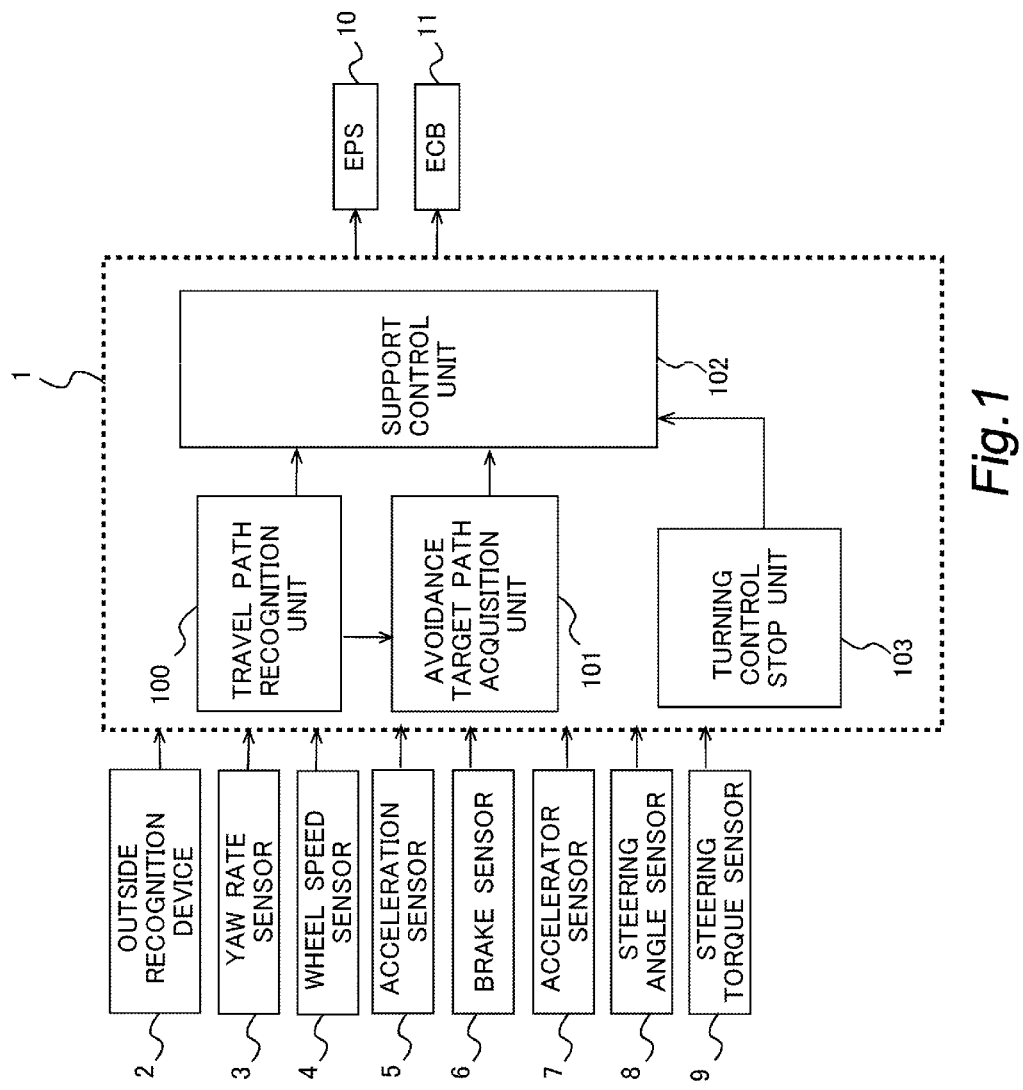
FIG. 1 is a view showing the construction of a driving support system for a vehicle according to the present invention.

First, a first embodiment of the present invention will be described. FIG. 1 is a block diagram showing the construction of a driving support system for a vehicle according to the present invention in a function-based manner. As shown in FIG. 1, a control unit (ECU) 1 for driving support is mounted in a vehicle.

The ECU 1 is an electronic control unit which is provided with a CPU, a ROM, a RAM, a backup RAM, an I/O interface, and so on. A various kinds of sensors such as an outside recognition device 2, a yaw rate sensor 3, a wheel speed sensor 4, an acceleration sensor 5, a brake sensor 6, an accelerator sensor 7, a steering angle sensor 8, a steering torque sensor 9, and so on are electrically connected to the ECU 1, so that the output signals of these sensors are inputted to the ECU 1.

The outside recognition device 2 includes at least one of measuring devices such a, for example, an LIDAR (Laser Imaging Detection And Ranging), an LRF (Laser Range Finder), a millimeter wave radar, a stereoscopic camera, etc., and detects information with respect to the relative positions (e.g., a relative distance, a relative angle, etc.) of a three-dimensional or solid object 30 existing in the surroundings of the vehicle and an own or subject vehicle 20. Here, note that the detection of the information with respect to the solid object 30 by the outside recognition device 2 is widely disclosed in conventional technology, so the details thereof are omitted in this description. The yaw rate sensor 3 is mounted, for example, on the vehicle body of the subject vehicle 20, and outputs an electrical signal correlated with a yaw rate acting on the subject vehicle 20. The wheel speed sensor 25 is a sensor which is mounted on a road wheel of the subject vehicle 20, and outputs an electrical signal correlated with the travel speed of the vehicle (vehicle speed). The acceleration sensor 5 outputs an electrical signal correlated with an acceleration (longitudinal (front and rear) acceleration) which acts in the longitudinal (front and rear) direction of the subject vehicle 20, and an acceleration (transverse (lateral) acceleration) which acts in the transverse (right and left) direction of the subject vehicle 20. The brake sensor 3 is mounted, for example, on a brake pedal inside a passenger compartment, and outputs an electrical signal correlated with an operation toque (stepping or depression force) of the brake pedal. The accelerator sensor 7 is mounted, for example, on an accelerator pedal inside the passenger compartment, and outputs an electrical signal correlated with an operation toque (stepping or depression force) of the accelerator pedal. The steering angle sensor 8 is mounted, for example, on a steering rod connected to a steering wheel in the passenger compartment, and outputs an electrical signal correlated with a rotational angle (angle of rotation) from a neutral position of the steering wheel. The steering torque sensor 9 is mounted on the steering rod, and outputs an electrical signal correlated with a torque (steering torque) inputted to the steering wheel.

In addition, a variety of kinds of equipment such as an EPS (electric power steering) 10, an ECB (electronic controlled brake) 11, etc., are connected to the ECU 1. The EPS 10 is a device which assists the steering torque of the steering wheel by making use of the torque generated by an electric motor. The ECB 11 is a device which electrically regulates the operating oil pressure (brake oil pressure) of a friction brake provided on each road wheel.

The driving support system shown in FIG. 1 constructed in this manner achieves assist or support control for collision avoidance, etc., by the ECU 1 which electrically controls the EPS 10 and the ECB 11 based on the information from the above-mentioned various kinds of sensors, etc., which are connected to the ECU 1. Stated in another way, the ECU 1 has functions related to functional blocks shown in FIG. 1, in order to control the various kinds of equipment for the purpose of collision avoidance, etc., by making use of the output signals of the above-mentioned various kinds of sensors. That is, the ECU 1 is provided with a travel path recognition unit 100, an avoidance target path acquisition unit 101, a support control unit 102, and a turning control stop unit 103.

The travel path recognition unit 100 generates information with respect to a road (travel path) on which the subject vehicle 20 will travel from now on, based on the information outputted from the outside recognition device 2. For example, in a coordinate system in which the subject vehicle 20 is located on the origin, the travel path recognition unit 100 generates information on the position coordinates of the solid object 30, which can be an obstacle to the subject vehicle 20, and indices indicating lane boundaries (e.g., traffic signs painted on the road, such as white lines, yellow lines, etc., which indicate lane boundaries, the solid object 30 such as curbstones extending at lane sides, guardrails, roadside gutters or ditches, walls, poles, etc.), and the posture (a distance, a yaw angle, etc.) of the subject vehicle 20 with respect to the solid object 30 or the lane boundaries. Here, note that the travel path recognition unit 100 corresponds to a recognition unit according to the present invention.

Figure 2:
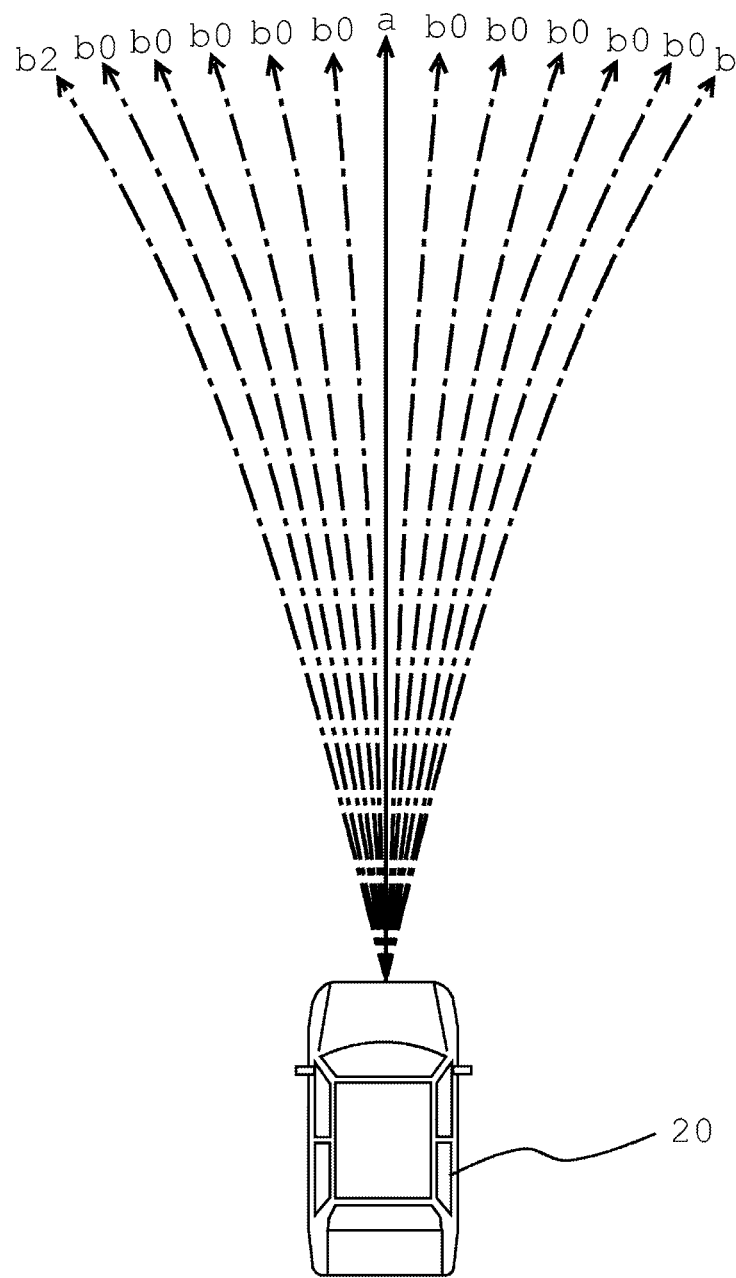
FIG. 2 is a view showing a travel range of a vehicle during traveling.

The avoidance target path acquisition unit 101 acquires avoidance target paths which the subject vehicle 20 can take, in order to avoid the collision with the solid object 30 recognized by the travel path recognition unit 100, in the coordinate system generated by the travel path recognition unit 100. These avoidance target paths are each a path which is acquired, for example, based on the travel state of the subject vehicle 20 such as the vehicle speed, the transverse acceleration, etc., of the subject vehicle 20. Specifically, the avoidance target path acquisition unit 101 acquires a current transverse acceleration Gy0 of the subject vehicle 20 from the output signal of the acceleration sensor 5, as shown in FIG. 2, and specifies a path a along which the subject vehicle 20 will pass if it is assumed that the subject vehicle 20 is traveling while maintaining the current transverse acceleration Gy0. Then, the avoidance target path acquisition unit 101 specifies a path b1 through which the subject vehicle 20 is predicted to pass, in cases where a maximum amount of change ΔGy of a transverse force required for the subject vehicle 20 to turn safely at the current speed of the subject vehicle 20 is added to the current transverse acceleration Gy0 of the subject vehicle 20, and at the same time, specifies a path b2 through which the subject vehicle 20 is predicted to pass, on the contrary, in cases where the maximum amount of change ΔGy of the transverse force is subtracted from the current transverse acceleration Gy0 of the subject vehicle 20. The maximum amount of change ΔGy should only be set as appropriate based on factors related to safe travel of the subject vehicle, such as the structure of the subject vehicle, the steering of the driver, etc.

With respect to the paths b1, b2, more specifically, the avoidance target path acquisition unit 101 should only calculate a turning radius R of the subject vehicle 20 from a value obtained by adding or subtracting the maximum amount of change ΔGy to or from the current transverse acceleration Gy0, and specify the paths b1, b2 based on the turning radius R thus calculated. Here, note that the turning radius R can be obtained by dividing the vehicle speed V by a yaw rate $\gamma$ (R=V/$\gamma$), and at the same time, the yaw rate $\gamma$ can be obtained by dividing the transverse acceleration Gy by the vehicle speed V ($\gamma$=Gy/V). Of course, a detected value by the yaw rate sensor 3 may be used as the yaw rate $\gamma$. Thereafter, the avoidance target path unit 101 specifies a path b0 in cases where the transverse acceleration is changed by a fixed amount at a time in a range (i.e., a travel range) from the path b1 to the path b2. Here, note that this fixed amount of change of the transverse acceleration may be set in an appropriate manner. Then, a path in which the turning of the subject vehicle 20 can avoid collision without interfering with the solid object 30 is specified as the avoidance target path based on the extent of interference of the solid object 30 existing in the direction of movement of the subject vehicle 20 with the paths b1, b2 and a plurality of paths b0 set therebetween.

Next, the support control unit 102 carries out driving support control for avoiding the collision with the solid object 30 and for reducing or mitigating shock and damage at the time of the collision, through the EPS 10, the ECB 11, etc., based on the information generated by the travel path recognition unit 100 and the avoidance target path acquired by the avoidance target path acquisition unit 101. The above-mentioned avoidance target path acquisition unit 101 and the above-mentioned support control unit 102 correspond to a support control unit according to the present invention. Specifically, the support control unit 102 calculates controlled variables of the EPS 10 and the ECB 11, and at the same time, operates the EPS 10 and the ECB 11 according to the controlled variables thus calculated. For example, the support control unit 102 calculates a target yaw rate required for avoiding the collision between the subject vehicle 20 and the solid object 30, and decides a controlled variable (steering torque) of the EPS 10 and a controlled variable (brake oil pressure) of the ECB 11 in such a manner that an actual yaw rate of the subject vehicle 20 (an output signal of the yaw rate sensor 3) becomes coincide with the target yaw rate. At that time, the relation between the target yaw rate and the steering torque as well as the relation between the target yaw rate and the brake oil pressure may be mapped in advance. Here, note that the method of decelerating the vehicle is not limited to a method of operating the friction brakes by means of the ECB 11, but there may also be used a method of converting (regenerating) the kinetic energy of the vehicle to electrical energy, or a method of changing the change gear ratio of a speed change gear (transmission) thereby to increase engine brake power.

Then, the turning control stop unit 103 has a function to stop the turning control of the subject vehicle 20 carried out by the support control unit 102, according to a predetermined judgment criterion. In the subject vehicle 20 placed under turning control, the EPS 10 exhibits a steering torque for steering the steering according to a command from the support control unit 102. Here, in cases where the friction of the road surface on which the subject vehicle 20 travels is relatively high, a reaction force which each wheel of the subject vehicle 20 receives from the road surface becomes a sufficient magnitude of an assumed extent, and as a result, a steering angle of the steering within a normal range will be generated according to the extent of turning of the vehicle under turning control. On the other hand, when the friction of the road surface on which the subject vehicle 20 travels is relatively low, the above-mentioned reaction force becomes small, and hence, even if the EPS 10 generates steering torque to steer the steering, the extent to which the subject vehicle is caused to turn will become small, and so, in order to achieve a desired extent of turning in terms of the turning control of the subject vehicle, it becomes necessary to generate a steering angle of the steering beyond the above-mentioned normal range. Because the behavior of the steering due to such a steering angle is felt uncomfortable for the driver, in cases where such a steering behavior occurs, the turning control stop unit 103 stops the turning control by the support control unit 102, thereby attaining to eliminate the strange or uncomfortable feeling of the driver.

Figure 3:
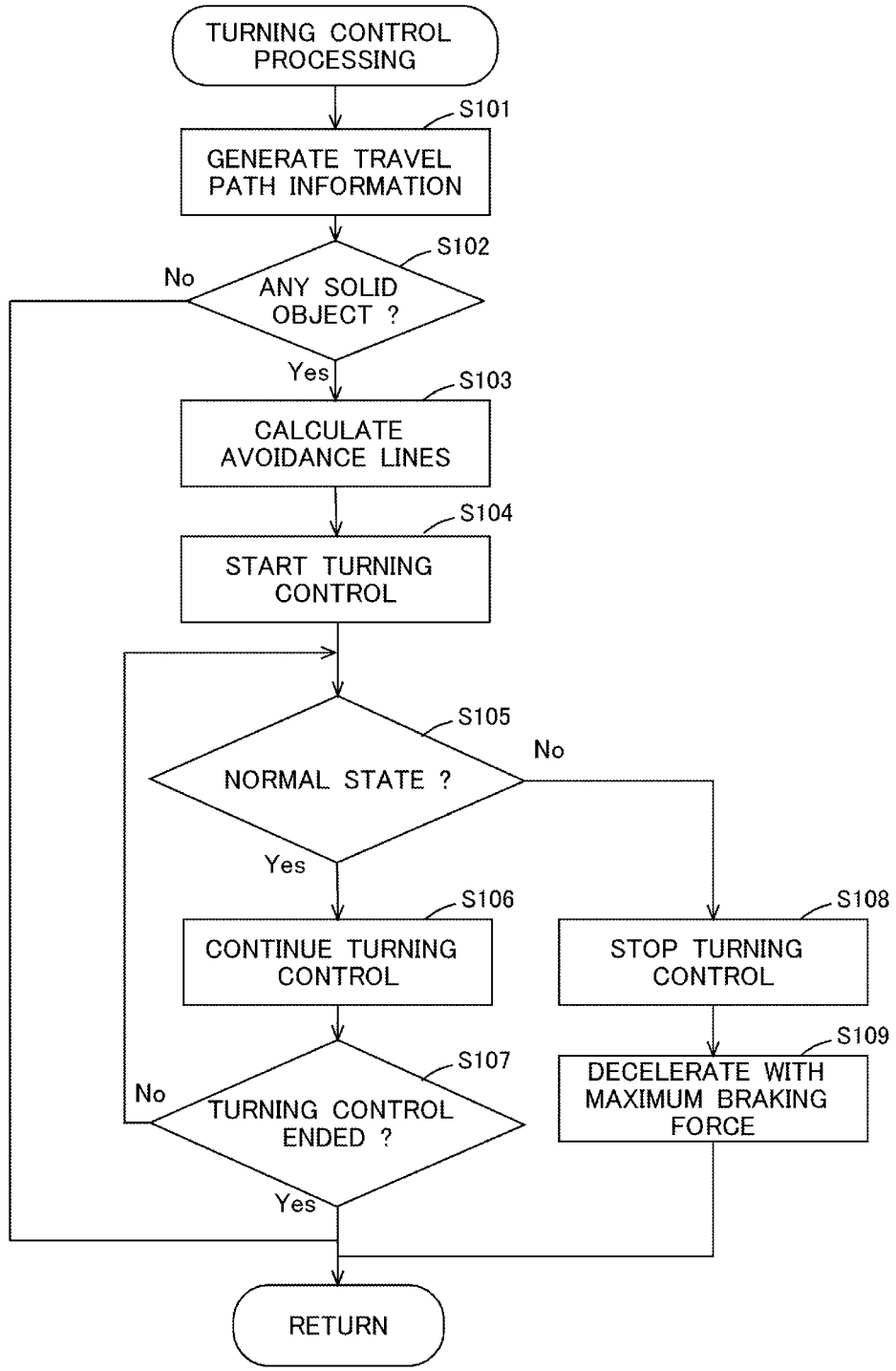
FIG. 3 is a flow chart of driving support processing in the form of turning control processing carried out in the driving support system for a vehicle shown in FIG. 1.

Reference will be made to the processing for collision avoidance carried out by the driving support system for a vehicle constructed in this manner, based on FIG. 3. The processing shown in FIG. 3 is a processing routine which is carried out by the ECU 1 in a repeated manner, and is stored as a control program in the ROM of the ECU 1, etc., in advance. First, in step S101, information with respect to a road on which the subject vehicle 20 will travel in the future is generated based on an output signal of the outside recognition device 2. That is, in the coordinate system in which the subject vehicle 20 is set as an origin, the ECU 1 generates information with respect to the position coordinates of the solid object 30, which can become an obstacle to the subject vehicle 20, and of indices showing lane boundaries, as well as the posture of the subject vehicle 20 with respect to the solid object 30 and/or the lane boundaries. After the processing of step S101 ends, the routine goes to step S102. Then, in step S102, the ECU 1 determines based on the above-mentioned information generated in step S101 whether the solid object 30 becoming an obstacle exists in the course direction of the subject vehicle 20. The "course" referred to herein is a path (e.g., the path a shown in FIG. 2) through which the subject vehicle 20 is predicted to pass in the case of continuing to travel while keeping the current transverse acceleration Gy0. In cases where the solid object 30 exists on this predicted path, or in cases where the solid object 30 exists in the range of a constant or fixed distance from this path, it will be judged that the solid object 30 exists in the direction of movement of the subject vehicle 20. When an affirmative determination is made in step S102, the routine goes to step S103, whereas when a negative determination is made, the ECU 1 once ends the execution of this routine. The processing according to the above-mentioned steps S101, S102 corresponds to processing according to the above-mentioned travel path recognition unit 100.

Subsequently in step S103, the transverse acceleration Gy0 at the current point in time of the subject vehicle 20 is read in by the above-mentioned avoidance target path acquisition unit 101 through the acceleration sensor 5, and a travel range in which the subject vehicle 20 can travel is calculated by adding or subtracting the maximum amount of change ΔGy of the above-mentioned transverse acceleration on the basis of the transverse acceleration Gy0 thus read in, so that travel paths capable of avoiding interference between the travel range and the solid object 30 are calculated as avoidance lines. These avoidance lines correspond to the avoidance target paths as mentioned above. After the processing of step S103 ends, the routine goes to step S104.

Figure 4:
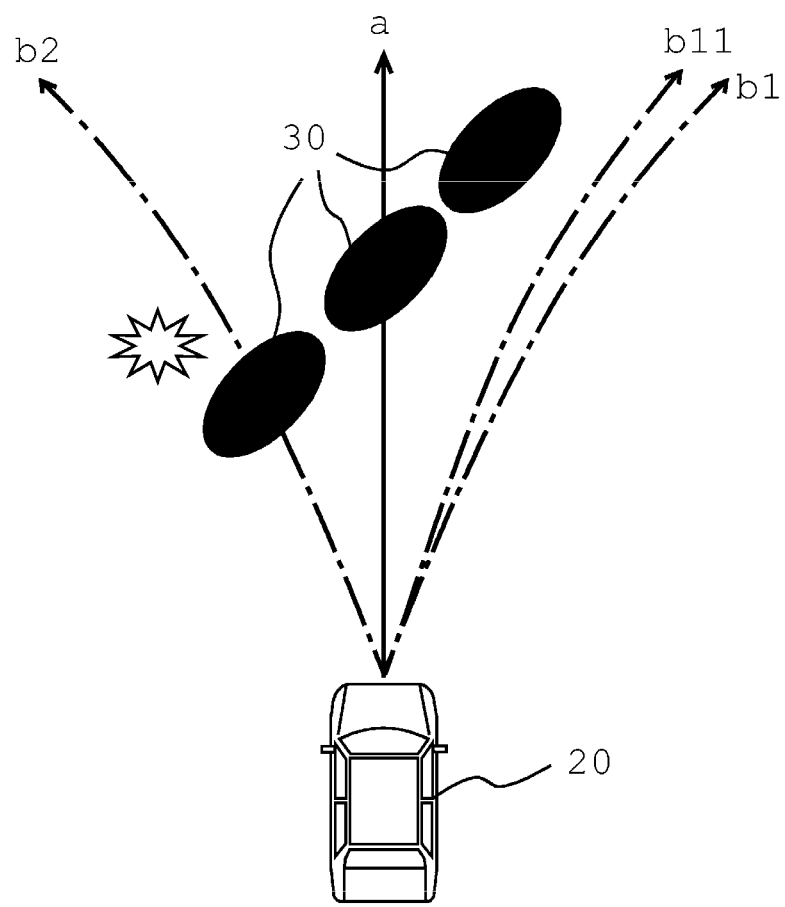
FIG. 4 is a first view showing avoidance target paths which the vehicle can take for collision avoidance with respect to a three-dimensional or solid object existing in the direction of movement.

In step S104, the turning control for causing the subject vehicle 20 to turn according to an avoidance line calculated in step S103 is started by means of the support control unit 102. In this embodiment, explanation will be made based on the relative positional relation between the subject vehicle 20 and the solid object 30, as shown in FIG. 4. As shown in FIG. 4, in cases where the solid object 30 is located on the travel course of the subject vehicle 20 and extends from the near front left side to the far front right side ahead of the subject vehicle 20, with its width being relatively long, the path b11 in addition to the path b1 exists, as an avoidance line, at the side of the path b1 corresponding to the maximum amount of change +ΔGy0 of the transverse acceleration, but no avoidance path exists at the side of the path b2 corresponding to the maximum amount of change −ΔGy of the transverse acceleration. This is due to the following reason. That is, the solid object 30 extends from the near front left side to the far front right side ahead of the subject vehicle 20, and hence, even if the transverse acceleration is changed by the maximum amount ΔGy0 in a minus direction so that the subject vehicle 20 travels on the path b2, the solid object 30 will come into interference with the subject vehicle on the path b2.

Here, which of the voidance lines b1, b11 is selected should only be regulated in an appropriate manner according to various purposes. For example, in cases where avoidable yaw rates for the subject vehicle 20 to travel on the avoidance lines b1, b11 are set as γ1, γ11, respectively, these two yaw rates have a correlation of γ1>γ11, as can be seen from the difference in the turning radius of the subject vehicle 20. Accordingly, by taking a point of view of suppressing the yaw rate generated at the time of turning as small as possible, the avoidance line b11 may be selected as a path in the turning control. In addition, as another method, there may be selected an avoidance line for which an absolute value |γ| of an avoidable yaw rate γ calculated in step S103 becomes equal to or less than a predetermined threshold value γ0. This predetermined threshold value γ0 is to set an upper limit in the absolute value of a transverse acceleration which is generated during turning travel of the subject vehicle 20, in order to enable the driver to override turning control while the support control unit 102 is carrying out the turning control with respect to the EPS 10. For example, 0.2 G-0.3 G can be adopted as the threshold value γ0. By selecting the avoidance line which satisfies such a condition, it is possible to secure the room for steering by the driver, while making it possible for the subject vehicle 20 to avoid the collision with the solid object 30.

Based on the above, in this embodiment, it is assumed that the turning control is carried out in such a manner that the subject vehicle travels on the avoidance line b11 in order to avoid the collision with the solid object 30. Specifically, the support control unit 102 sends a command to the EPS 10, so that the steering torque generated by the EPS 10 is applied to the steering, thereby performing the steering operation of the steering. Further, by carrying out the deceleration of the subject vehicle with the braking force by means of the ECB 11, in addition to such turning, it becomes possible to avoid the collision with the solid object 30 more safely. After the processing of step S104 ends, the routine goes to step S105.

Figure 5:
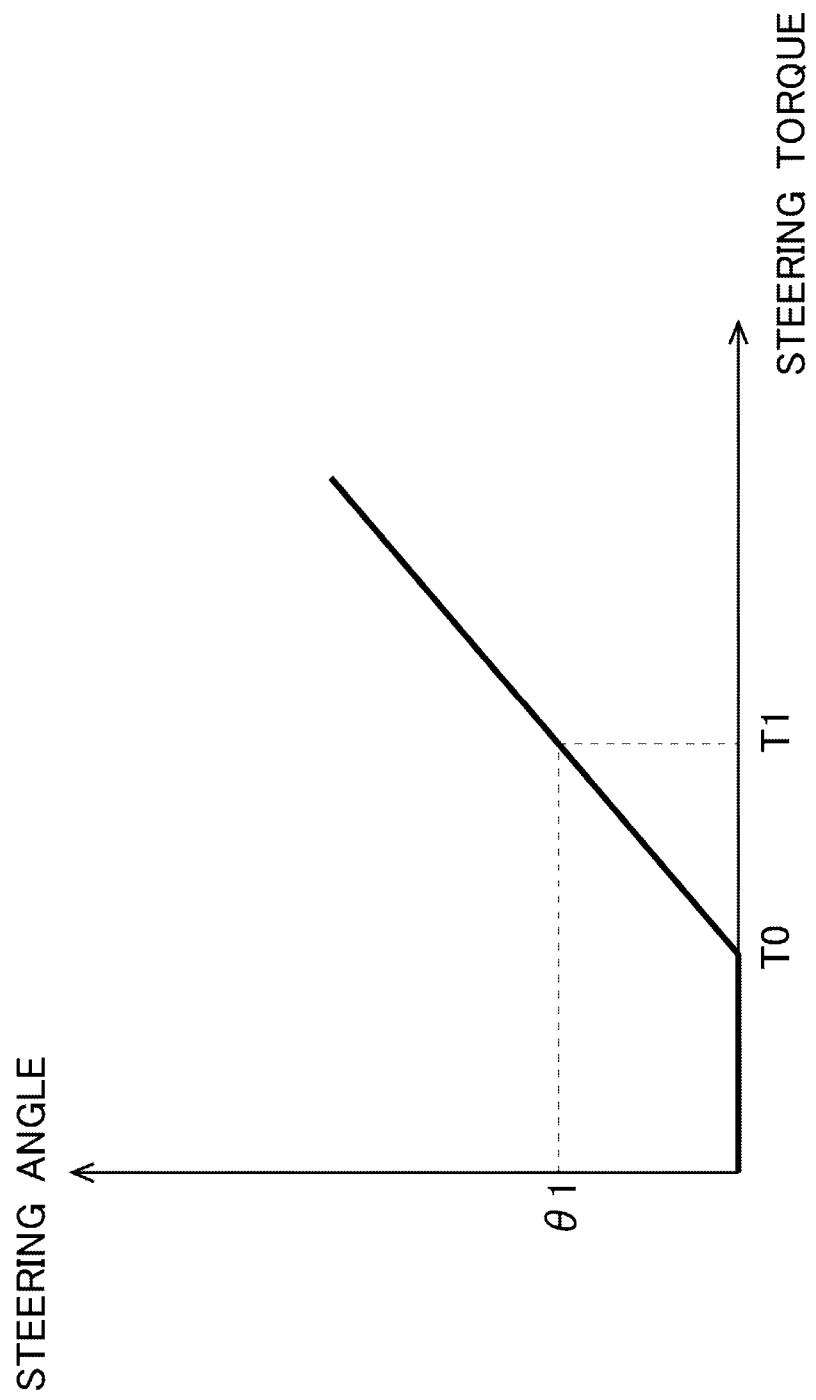
FIG. 5 is a graph showing a correlation between steering torque and a steering angle of a steering required for operation of the steering in a range where the steering torque and the steering angle are normal.

In step S105, in the subject vehicle 20 placed under turning control, it is determined whether the correlation between the steering torque of the EPS 10 as a predetermined parameter with respect to turning control and the steering angle of the steering as a parameter indicating a vehicle state at the time of the turning of the subject vehicle 20 belongs to the range of normal state. Here, note that the steering torque of the EPS 10 is detected by the steering torque sensor 9, and the steering angle of the steering is detected by the steering angle sensor 8. Here, in FIG. 5, there is shown the correlation in a normal state between the steering torque of the ESP 10 and the steering angle of the steering, which has been set in advance. The correlation shown in FIG. 5 is the correlation between the steering torque generated by the EPS 10 and the steering angle of the steering to be steered, which is plotted based on experiments, on the assumption that the subject vehicle 20 travels on a road surface with relatively high friction, and this correlation is stored in a memory in the ECU 1 as a control map.

Returning to FIG. 5, the steering is not substantially steered or operated in cases where the steering torque is equal to or less than T0. This is because there exists a mechanical frictional force in the interior of the steering. Accordingly, by the steering torque being applied to the steering when exceeding T0, the steering angle according to the steering torque will be generated in the steering. For example, when the steering torque required for the subject vehicle to travel on the avoidance line b11 is T1, the steering angle of the steering becomes θ1. Therefore, with the subject vehicle 20, in cases where a steering torque T1 is generated by the EPS 10, a condition where the steering is steered within a steering angle range of ±θ1 will belong to the range of "normal state" according to the present invention.

Here, in cases where the friction of the road surface on which the subject vehicle 20 travels is relatively low, the reaction force which the subject vehicle 20 receives from the road surface at the time of steering of the steering becomes relatively small, and hence, when the driver tries to cause the subject vehicle 20 to turn along the desired avoidance line b11, the steering angle of the steering will become large in comparison with the case where the friction of the road surface is relatively high. In such a case, although the travel state of the subject vehicle 20 is not necessarily unstable, the steering angle of the steering is usually θ1 in order for the subject vehicle 20 to travel on the avoidance line b11, but the steering angle of the steering can become several times larger than θ1, due to a decrease in the friction of the road surface. In that case, from the point of view of the driver, he or she will naturally feel uncomfortable to the behavior of the steering. Accordingly, in step S105, it is determined whether the correlation between the steering torque and the steering angle of the steering in the subject vehicle under turning control belongs to the range of normal state, and when an affirmative determination is made here, the routine goes to step S106, whereas when a negative determination is made, the routine goes to step S108.

In step S106, the turning control started in step S104 is continued. After that, in step S107, it is determined whether the turning control has ended. Specifically, looking at the correlation between the position of the subject vehicle 20 and the position of the solid object 30 at the current point in time, it is grasped or decided in which position on the avoidance line b11 the subject vehicle 20 is located, and it is then determined whether a turning control ending point set on the avoidance line is arrived. Here, the turning control ending point may be defined as a point at which the direction of movement of the subject vehicle 20, as a result of the turning control thereof, begins to become parallel to a direction in which the solid object 30 is located in a line. That is, when the direction of movement of the subject vehicle 20 becomes parallel to the direction in which the solid object 30 is located in a line, with the direction of movement of the subject vehicle 20 being maintained as it is, it will become possible to avoid the collision with the solid object 30, and so, the ending point of the turning control is specified by this. In addition, in place of the above-mentioned example, the turning control ending point may be defined as a point at which the subject vehicle 20 begins to move away from the solid object 30, as a result of the turning control. When the subject vehicle 20 has passed through the turning control ending point defined in this manner, a determination may be made that the turning control has ended. Moreover, as another method, in cases where turning control and braking control are carried out as driving support processing, a determination of the turning control having ended may be made by the fact that the subject vehicle 20 has been stopped as a result of the turning control and the braking control. When an affirmative determination is made in step S107, this routine is repeated from the start, whereas when a negative determination is made, the processing after step S105 is carried out in a repeated manner.

In addition, after the negative determination is made in step S105, then in step S108, stop processing for stopping the turning control started in step S104 is carried out. That is, in order to eliminate the strange or uncomfortable feeling of the driver due to the fact that the correlation between the steering torque and the steering angle of the steering in the subject vehicle under turning control does not belong to the range of normal state, the stop processing of the turning control is carried out. After the processing of step S108 ends, the routine goes to step S109. Here, because the turning control is stopped in step S108, a possibility of the subject vehicle 20 colliding with the solid object 30 will increase to no small extent as it is. Accordingly, in step S109, deceleration by a maximum braking force is carried out by the support control unit 102. Specifically, in cases where the braking control is also started at the same time with the start of the turning control in step S104, the braking force is caused to increase to the maximum braking force after the turning control is stopped. In addition, in cases where the braking control is not carried out at the time of the turning control, after the turning control is stopped, the braking control is started, and at the same time, the braking force is made to the maximum braking force. When the processing of step S109 ends, this routine is repeated again from the beginning.

According to the turning control processing shown in FIG. 3, the friction of the road surface on which the subject vehicle 20 travels decreases during a period of time after the turning control of the subject vehicle 20 is started in order to avoid the collision with the solid object 30, until the turning control thereof is ended, as a result of which when the correlation between the steering torque and the steering angle of the steering in the subject vehicle 20 under turning control does not belong to the range of normal state, the turning control itself is stopped. As a consequence, it is possible to eliminate a strange, unharmonious or uncomfortable feeling, which would be felt by the driver due to an excessive steering operation of the steering. In addition, if the friction of the traveling road surface of the subject vehicle 20 varies suddenly and becomes high in a state where the steering has been operated or steered to an excessive extent while the subject vehicle 20 is traveling on the low friction road surface, the reaction force received by the subject vehicle 20 from the road surface becomes large, thus giving rise to a fear that the travel state of the subject vehicle 20 may become unstable. However, according to the above-mentioned turning control processing, when the steering angle of the steering deviates from the range of normal state, the turning control is stopped, so that it becomes possible to suppress the instability of the travel state of the subject vehicle 20 resulting from the variation of the road surface friction.

Second Embodiment

Reference will be made to a second embodiment of driving support processing carried out by the driving support system shown in FIG. 1, based on FIG. 6 and FIG. 7. Here, note that with respect to individual steps which constitute the driving support processing shown in FIG. 6, the detailed explanation thereof will be omitted by attaching the same reference numbers to those which have the same contents as in the turning control processing shown in FIG. 3. In the driving support processing shown in FIG. 6, the routine thereof goes to step S201, after the processing of step S103 ends.

In step S201, it is determined by the support control unit 102 whether avoidance lines to be taken in order to prevent the subject vehicle 20 from coming into collision with the recognized solid object 30 exist in both right and left directions of the subject vehicle 20 on the opposite sides of the solid object 30. This determination is to determine whether at least one avoidance line exists in each of the right and left directions (width directions) of the subject vehicle 20 on the basis of the solid object 30, wherein even if a plurality of avoidance lines exist, but in cases where they exist only in one direction among the right and left directions of the subject vehicle 20 on the basis of the solid object 30, a negative determination will be made in S201. For example, as shown in FIG. 7, in cases where the solid object 30 is located substantially on a travel course a of the subject vehicle 20 and the width of the solid object 30 is relatively small, there exist, as avoidance lines, a path b11 in addition to the path b1 lying at the side of the path b1 corresponding to a maximum amount of change $+\Delta Gy0$ of the transverse acceleration, and a path b21 in addition to the path b2 lying at the side of the path b2 corresponding to a maximum amount of change $-\Delta Gy$ of the transverse acceleration. Thus, in a state as shown in FIG. 7, the paths b1, b11 exist as avoidance lines at the right side of the subject vehicle 20, and the paths b2, b21 exist as avoidance lines at the left side of the subject vehicle 20. Accordingly, in such a state, the avoidance lines exist in both the right and left directions (i.e., at the opposite sides) of the subject vehicle 20, and hence, in step S201, an affirmative determination is made.

In addition, as shown in the above FIG. 4, in cases where the solid object 30 is located on the travel course of the subject vehicle 20 and extends from the near front left side to the far front right side ahead of the subject vehicle 20, with its width being relatively long, the path b11 in addition to the path b1 exists, as an avoidance line, at the side of the path b1 corresponding to the maximum amount of change $+\Delta Gy0$ of the transverse acceleration, but no avoidance path exists at the side of the path b2 corresponding to the maximum amount of change $-\Delta Gy$ of the transverse acceleration. Accordingly, in such a case, a negative determination will be made in step S201. Here, note that even if the number of avoidance lines decreases, leaving only the path b1, or even if a further more number of avoidance lines exist only at the right side of the subject vehicle 20 with respect to the solid object 30, there will be no change in the result of the determination.

In short, in this routine, when an affirmative determination is made in step S201, the routine goes to step S202, whereas when a negative determination is made, the routine goes to step S203. Here, in step S202, driving support processing for avoiding the collision between the solid object 30 and the subject vehicle 20 is carried out by the support control unit 102. This processing will be specifically explained based on FIG. 7. As mentioned above, in the state shown in FIG. 7, the avoidance lines which the subject vehicle 20 should take exist in both the right and left directions of the subject vehicle 20 at the opposite sides of the solid object 30. In other words, the subject vehicle 20 can avoid the collision with the solid object 30 by being turned to the right side, or by being turned to the left side, too. In such a case, if the support control unit 102 acts on the EPS 10 so as to cause the subject vehicle to turn either to the right or to the left, the driver of the subject vehicle 20 may steer to turn to the opposite direction. In that case, the driving support processing of the support control unit 102 interferes with driver's own steering, so it means for the driver that processing not matched to a driver's feeling has been carried out.

Accordingly, in the driving support processing in step S202, the support control unit 102 does not carry out the turning of the subject vehicle 20, which would be caused by changing the steering angle by means of the EPS 10, but instead, carries out deceleration with the maximum braking force by means of the ECB 11. Here, note that in this processing, the support control unit 102 does not carry out control with respect to the turning of the subject vehicle 20, but instead, it is ensured for the driver that the driver can perform steering based on his or her own judgment. Thus, by carrying out, as the driving support processing, only deceleration by means of the braking force, and by leaving the turning of the subject vehicle 20 by means of steering to the discretion of the driver, it is possible to avoid the processing which is not matched to the feeling of the driver from being carried out. Here, note that in order to enable the turning of the subject vehicle by steering of the driver, it is preferable to generate a braking force which becomes a maximum in a range in which a transverse force such as required for the turning of the subject vehicle can be generated. However, as long as the subject vehicle 20 can be slowed down to a sufficient extent before colliding with the solid object 30, the braking force for deceleration of the subject vehicle 20 may be secured in preference to the transverse force for the turning by the steering of the driver. When the processing of step S201 ends, this routine is repeated again from the beginning.

On the other hand, in step S203, turning control processing is carried out by the support control unit 102, as the driving support processing for avoiding the collision between the solid object 30 and the subject vehicle 20. As this turning control processing, processing in steps S104 through S109, which constitutes the turning control processing shown in FIG. 3, will be carried out. Accordingly, in the turning control processing in step S203, the turning control of the subject vehicle 20 is started in order to avoid the collision with the solid object 30, but the correlation between the steering torque by the EPS 10 and the steering angle of the steering in the subject vehicle 20 placed under the turning control is supervised, so that the turning control will be stopped when this correlation does not belong to the range of normal state.

Figure 6:
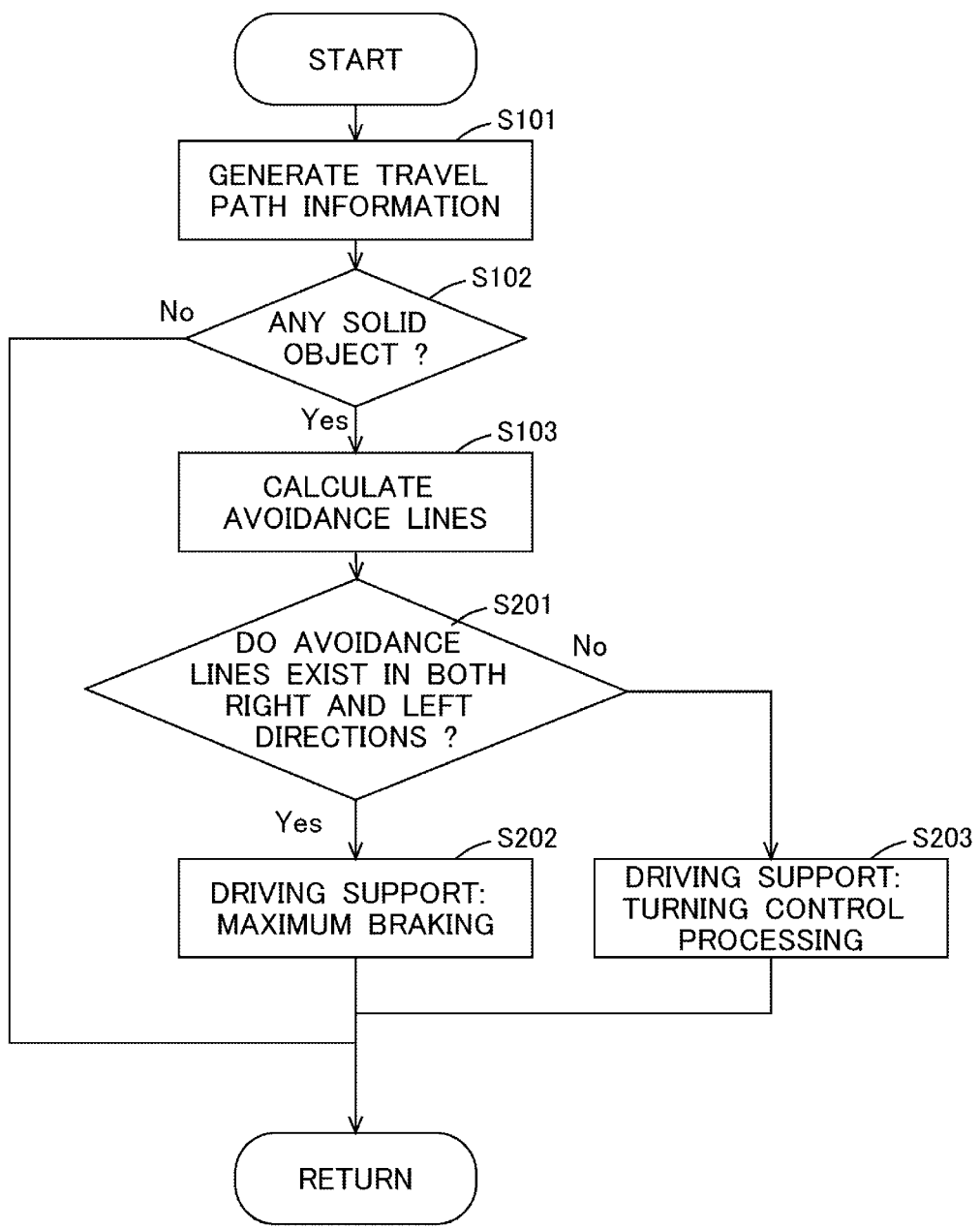
FIG. 6 is a second flow chart of driving support processing carried out in the driving support system for a vehicle shown in FIG. 1.
Figure 7:
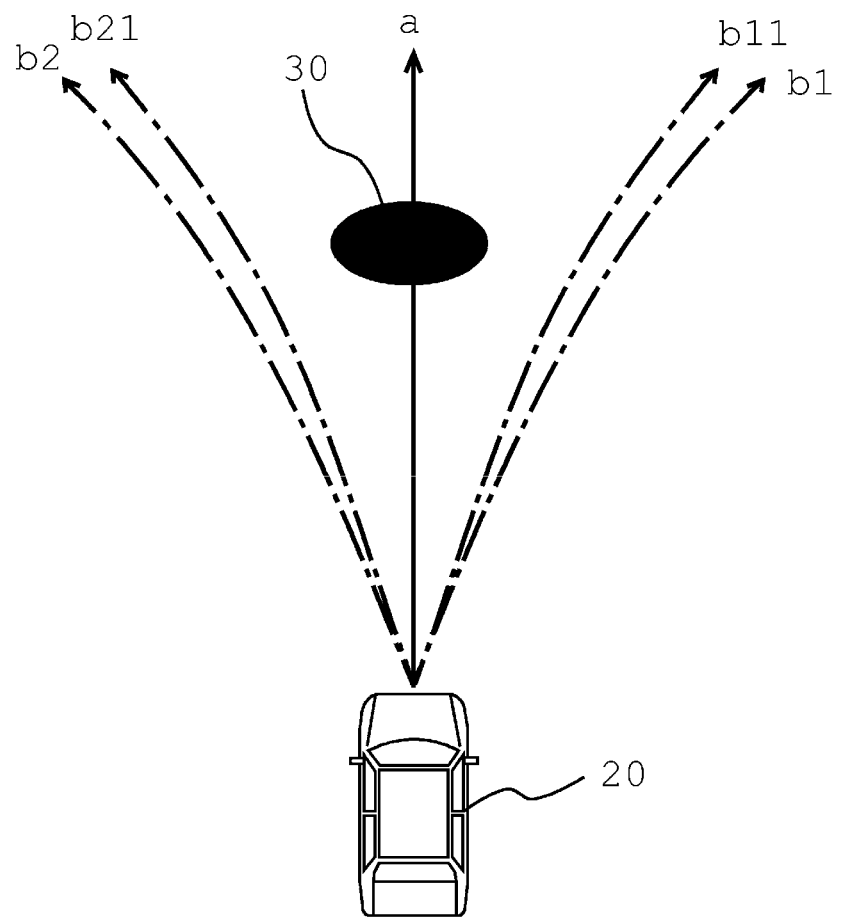
FIG. 7 is a second view showing avoidance target paths which the vehicle can take for collision avoidance with respect to a three-dimensional or solid object existing in the direction of movement.

In this manner, according to the driving support control shown in FIG. 6, the contents of processing to be carried out by the support control unit 102 are regulated according to whether avoidance lines, which the subject vehicle 20 should take when the solid object 30 has been recognized, exist in both the right and left directions of the subject vehicle 20 at the opposite sides of the solid object 30. As a result, it becomes possible to avoid the collision of the subject vehicle 20 with the solid object 30, while providing the driving support processing matched with the feeling of the driver of the subject vehicle 20. Furthermore, even when the turning control of the subject vehicle 20 is carried out, it is possible to eliminate a strange, unharmonious or uncomfortable feeling, which would be felt by the driver due to an excessive steering operation of the steering, as mentioned above, and it becomes possible to suppress the instability of the travel state of the subject vehicle 20 resulting from the variation of the road surface friction.

DESCRIPTION OF THE REFERENCE SIGNS

1 ECU
2 outside recognition device
3 yaw rate sensor
4 wheel speed sensor
5 acceleration sensor
6 brake sensor
7 accelerator sensor
8 steering angle sensor
9 steering torque sensor
10 EPS (electric power steering)
11 ECB (electronic controlled brake)
20 subject vehicle
30 solid object
100 travel path recognition unit
101 avoidance target path acquisition unit
102 support control unit
103 turning control stop unit

The invention claimed is:

1. A driving support system for a vehicle comprising:
a recognition unit configured to recognize a solid object existing in a direction of movement of a subject vehicle;
a support control unit configured to perform turning control of the subject vehicle for avoiding a collision between the solid object and the subject vehicle based on a travel state of the subject vehicle, in cases where an existence of the solid object has been recognized by the recognition unit;
a turning control stop unit configured to stop the turning control by the support control unit, in cases where a correlation between a vehicle state related to turning of the subject vehicle by the support control unit and a value of a predetermined parameter related to the turning control by the support control unit does not belong to a range of normal state set in advance, after the turning control by the support control unit has been started; and
a steering torque generator that serves to apply a steering torque for turning to a steering of the subject vehicle according to a turning command from the support control unit;
wherein the turning control stop unit stops the turning control by the support control unit, in cases where a correlation between at least any among a steering angle of the steering, a yaw rate of the subject vehicle, and a transverse acceleration acting on the subject vehicle, as a parameter indicating the vehicle state, and the steering torque applied to the steering by means of the steering torque generator does not belong to the range of normal state; and
the range of normal state is set to correspond to the steering torque, based on an operating state of the steering which the driver of the subject vehicle can permit, at the time when the turning control is carried out by the support control unit.

2. The driving support system for a vehicle as set forth in claim 1, further comprising:
   the support control unit decelerates the subject vehicle by means of control with respect to braking of the subject vehicle, when the turning control of the subject vehicle is stopped by the turning control stop unit.

* * * * *